(12) United States Patent
Itou (10) Patent No.: US 11,177,739 B2
(45) Date of Patent: Nov. 16, 2021

(54) CONTROL CIRCUIT OF DC/DC CONVERTER, DC/DC CONVERTER, POWER MANAGEMENT CIRCUIT, AND SOLID STATE DRIVE

(71) Applicant: ROHM CO., LTD., Kyoto (JP)

(72) Inventor: Kazunori Itou, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 103 days.

(21) Appl. No.: 16/576,847

(22) Filed: Sep. 20, 2019

(65) Prior Publication Data

US 2020/0099301 A1 Mar. 26, 2020

(30) Foreign Application Priority Data

Sep. 21, 2018 (JP) .............................. JP2018-176911

(51) Int. Cl.
*H02M 3/158* (2006.01)
*G05F 1/46* (2006.01)
*H02M 1/32* (2007.01)

(52) U.S. Cl.
CPC ............ *H02M 3/1582* (2013.01); *G05F 1/46* (2013.01); *H02M 1/32* (2013.01)

(58) Field of Classification Search
None
See application file for complete search history.

(56) References Cited

U.S. PATENT DOCUMENTS

| 10,355,584 | B1* | 7/2019 | Oak | H02M 1/088 |
| 2001/0050546 | A1* | 12/2001 | Marty | G05F 1/575 323/280 |
| 2009/0015217 | A1* | 1/2009 | Harriman | H02M 3/1588 323/266 |
| 2014/0191740 | A1* | 7/2014 | Ferrario | H05B 45/37 323/282 |

FOREIGN PATENT DOCUMENTS

JP 2007124749 A 5/2007

* cited by examiner

*Primary Examiner* — Jeffrey A Gblende
(74) *Attorney, Agent, or Firm* — Cantor Colburn LLP (57) ABSTRACT

A control circuit of a DC/DC converter includes: an error amplifier configured to generate an error voltage corresponding to an error between a feedback voltage based on an output voltage of the DC/DC converter and a reference voltage; a pulse modulator configured to generate a control pulse corresponding to the error voltage; and an auxiliary circuit configured to be enabled, when the output voltage of the DC/DC converter is decreased, to compare the feedback voltage with a ramp signal that decreases with time, and source or sink an auxiliary current to an output of the error amplifier according to a result of the comparison.

10 Claims, 8 Drawing Sheets

CONTROL CIRCUIT OF DC/DC CONVERTER, DC/DC CONVERTER, POWER MANAGEMENT CIRCUIT, AND SOLID STATE DRIVE

CROSS-REFERENCE TO RELATED APPLICATION

This application is based upon and claims the benefit of priority from Japanese Patent Application No. 2018-176911, filed on Sep. 21, 2018, the entire contents of which are incorporated herein by reference.

TECHNICAL FIELD

The present disclosure relates to a control circuit of a DC/DC converter, a DC/DC converter, a power management circuit, and a solid state drive.

BACKGROUND

Figure 1:
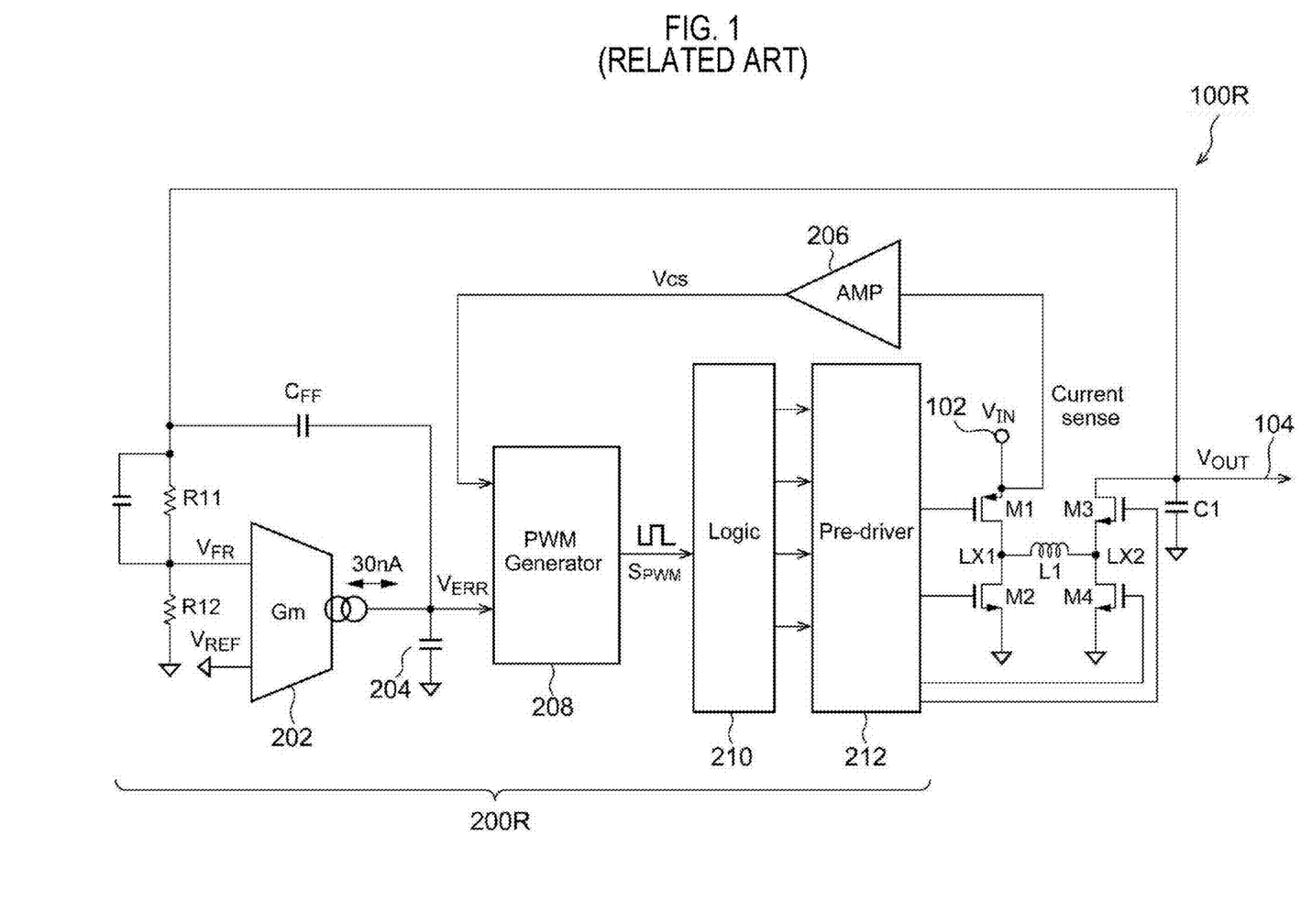
FIG. 1 is a circuit diagram of a step-up/step-down DC/DC converter.

A DC/DC converter that converts a DC voltage value to another DC voltage value is indispensable for various applications such as electronic equipment, industrial machinery and automobiles. FIG. 1 is a circuit diagram of a step-up (or boost)/step-down (or buck) DC/DC converter 100R. The DC/DC converter 100R receives a DC input voltage $V_{IN}$ at an input terminal 102 and supplies a stepped-up or stepped-down output voltage $V_{OUT}$ to a load (not shown) connected to an output terminal 104.

The DC/DC converter 100R includes a plurality of transistors M1 to M4, an inductor L1, an output capacitor C1, and a control circuit 200R. The control circuit 200R includes a gm (transconductance) amplifier 202, a capacitor 204, a current detection circuit 206, a pulse modulator 208, a logic circuit 210, and a pre-driver 212.

The capacitor 204 is connected to the output of the gm amplifier 202. The gm amplifier 202 amplifies an error between a feedback voltage $V_{FB}$ corresponding to the output voltage $V_{OUT}$ and a reference voltage $V_{REF}$ which defines a target value of the output voltage $V_{OUT}$, and charges and discharges the capacitor 204 with a current corresponding to the error. An error voltage $V_{ERR}$ corresponding to the error between the feedback voltage $V_{FB}$ and the reference voltage $V_{REF}$ is generated in the capacitor 204.

The pulse modulator 208 generates a pulse signal $S_{PWM}$ having a duty ratio corresponding to the error voltage $V_{ERR}$. The current detection circuit 206 generates a current detection signal $V_{CS}$ indicating a current flowing through the inductor L1. In a current mode control circuit, the current detection signal $V_{CS}$ is reflected in the duty ratio of the pulse signal $S_{PWM}$. The current detection signal $V_{CS}$ is used for overcurrent protection and the like.

The logic circuit 210 generates drive signals S1 to S4 for instructing the transistors M1 to M4 to turn on/off based on the pulse signal $S_{PWM}$. The pre-driver 212 controls the corresponding transistors M1 to M4 according to the drive signals S1 to S4.

As a result of studies on the DC/DC converter 100R of FIG. 1, the present inventor has come to recognize the following problems.

In applications where low power consumption is strongly demanded, it is necessary to reduce the current consumption of the control circuit 200R to a limit. For example, in the control circuit 200R for mobile equipment, it is required to suppress a quiescent current Iq to the order of several nA to several hundred nA.

In the control circuit 200R, a ratio of the operating current of the gm amplifier 202 in the quiescent current Iq is high, and in order to reduce the quiescent current Iq, it is necessary to reduce the operating current of the gm amplifier 202.

When the DC/DC converter 100R is stopped, there is a case where the output voltage $V_{OUT}$ is required to decrease to zero within a predetermined period of time. For this purpose, the reference voltage $V_{REF}$ is ramped down at a predetermined slew rate.

In order to lower the output voltage $V_{OUT}$ in a no-load state, it is necessary to discharge the output capacitor C1 through the transistors M1 to M4 and the inductor L1. However, if the operating current of the gm amplifier 202 is designed to be small, since a charging/discharging speed of the capacitor 204 is limited by a current supply capability of the gm amplifier 202, a changing speed of the error voltage $V_{ERR}$ is slow. Due to the response delay of the error voltage $V_{ERR}$, the output voltage $V_{OUT}$ cannot follow the ramped-down reference voltage $V_{ERR}$.

In applications of low quiescent current, a feed forward capacitor $C_{FF}$ may be inserted to improve a load fluctuation response speed during normal operation (with a constant output voltage). The feed forward capacitor $C_{FF}$ can assist charging/discharging of the capacitor 204 by the gm amplifier 202 to increase the response speed.

However, when the feed forward capacitor $C_{FF}$ is inserted, charging/discharging of the feed forward capacitor $C_{FF}$ has a reverse polarity to the charging/discharging of the capacitor 204 when the output voltage $V_{OUT}$ is intentionally changed. Therefore, during the ramp-down operation, the changing speed of the error voltage $V_{ERR}$ is limited by the feed forward capacitor $C_{FF}$ and a decrease speed of the output voltage $V_{OUT}$ is further slowed down.

Although the problem at the time of ramp-down is demonstrated here, the same situation may arise at the time of ramp-up.

SUMMARY

Some embodiments of the present disclosure provide a control circuit capable of changing an output voltage $V_{OUT}$ at a high speed while suppressing a quiescent current.

According to an embodiment of the present disclosure, a control circuit for a DC/DC converter is provided. The control circuit includes: an error amplifier configured to generate an error voltage corresponding to an error between a feedback voltage based on an output voltage of the DC/DC converter and a reference voltage; a pulse modulator configured to generate a control pulse corresponding to the error voltage; and an auxiliary circuit configured to be enabled, when the output voltage of the DC/DC converter is decreased, to compare the feedback voltage with a ramp signal that decreases with time, and source or sink an auxiliary current to an output of the error amplifier according to a result of the comparison.

According to this embodiment, by combining the feedback (closed loop) control including the error amplifier with the open loop control by the auxiliary circuit, it is possible to increase a decrease speed of the output voltage without affecting a stability of the feedback loop.

In some embodiments, the control circuit may further includes a voltage source configured to decrease the reference voltage with time when the DC/DC converter is stopped. The reference voltage may be input to the auxiliary circuit as the ramp signal According to another embodiment of the present disclosure, a control circuit for a DC/DC converter is provided.

The control circuit includes: an error amplifier configured to generate an error voltage corresponding to an error between a feedback voltage based on an output voltage of the DC/DC converter and a reference voltage; a pulse modulator configured to generate a control pulse corresponding to the error voltage; and an auxiliary circuit configured to be enabled, when the output voltage of the DC/DC converter is increased, to compare the feedback voltage with a ramp signal that increases with time, and source or sink an auxiliary current to an output of the error amplifier according to a result of the comparison.

According to this embodiment, by combining the feedback (closed loop) control including the error amplifier with the open loop control by the auxiliary circuit, it is possible to increase an increase speed of the output voltage without affecting the stability of the feedback loop.

In some embodiments, the control circuit may further includes a voltage source configured to increase the reference voltage with time when the DC/DC converter is started. The reference voltage may be input to the auxiliary circuit as the ramp signal.

In some embodiments, the auxiliary circuit may includes: a comparator configured to compare the feedback voltage with the ramp signal; and a current source connected to the output of the error amplifier and capable of being controlled to be turned on/off in accordance with an output of the comparator.

In some embodiments, the error amplifier may include: a capacitor; and a transconductance amplifier configured to receive the feedback voltage and the reference voltage, and charge and discharge the capacitor according to the error between the feedback voltage and the reference voltage. An output current capability of the auxiliary circuit may by higher than an output current capability of the transconductance amplifier.

Any combinations of the above-described elements or changes of representations of the elements of the present disclosure between methods, apparatuses and systems are also effective as embodiments of the present disclosure.

DETAILED DESCRIPTION

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically and directly connected or even a case where the member A and the member B are indirectly connected through any other member that does not affect an electrical connection state between the members A and B.

Similarly, "a state where a member C is installed between a member A and a member B" includes a case where the member A and the member C or the member B and the member C are indirectly connected through any other member that does not affect an electrical connection state between the members A and C or the members B and C, in addition to a case where the member A and the member C or the member B and the member C are directly connected.

In addition, "signal A (voltage or current) corresponds to signal B (voltage or current)" means that the signal A is correlated with the signal B. Specifically, it means that (i) the signal A is the signal B, (ii) the signal A is proportional to the signal B, (iii) the signal A is obtained by level-shifting the signal B, (iv) the signal A is obtained by amplifying the signal B, (v) the signal A is obtained by inverting the signal B, or (vi) any combination thereof, etc. It should be understood by those skilled in the art that a range of "corresponds to" is determined depending on types and uses of the signals A and B.

The vertical and horizontal axes of the waveform diagrams and time charts referred to in the present disclosure are enlarged or reduced as appropriate for ease of understanding, and each waveform shown is also simplified, exaggerated or emphasized for ease of understanding.

Figure 2:
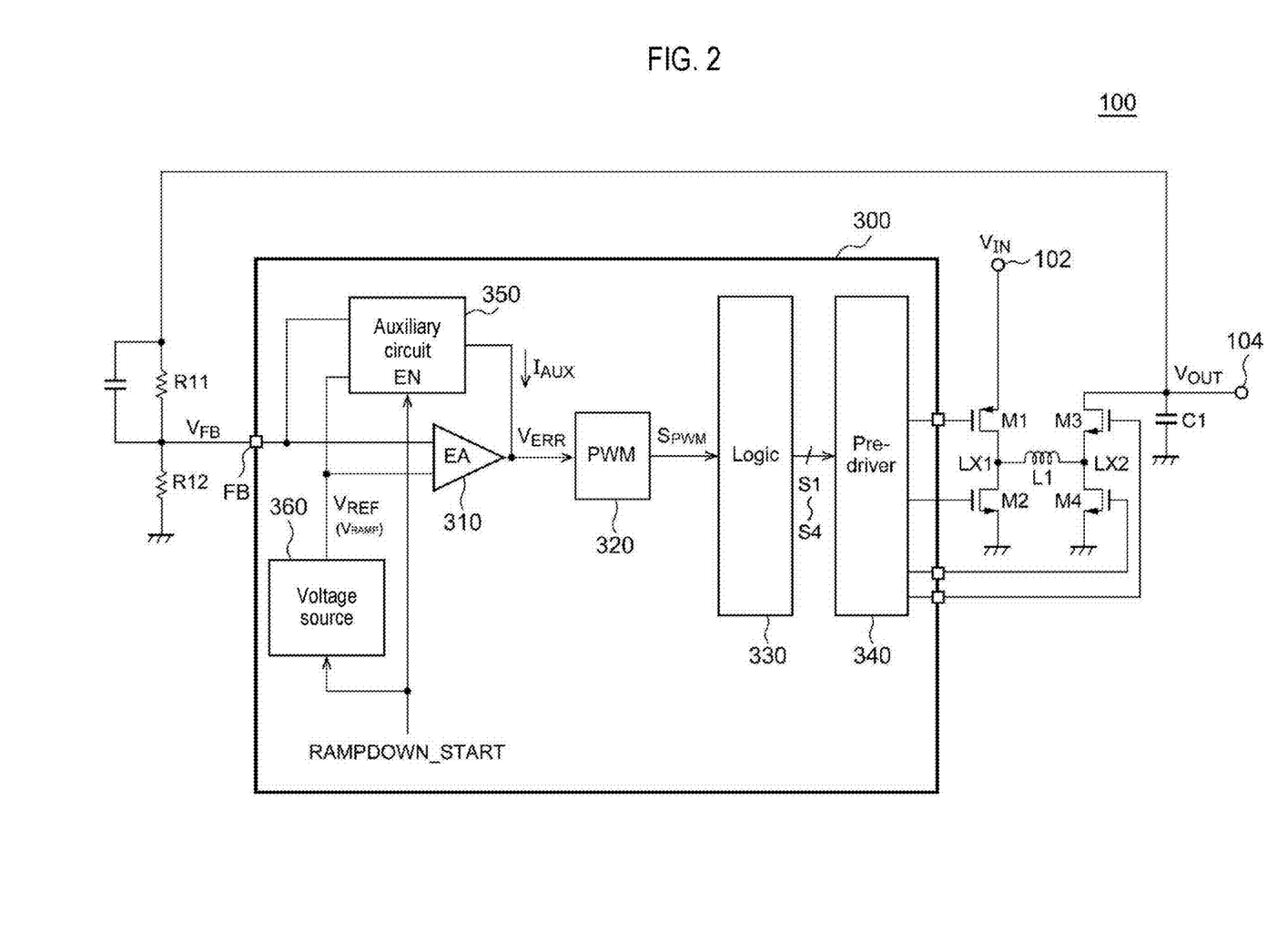
FIG. 2 is a block diagram of a DC/DC converter according to an embodiment of the present disclosure.

FIG. 2 is a block diagram of a DC/DC converter 100 according to an embodiment of the present disclosure. The DC/DC converter 100, which is of a step-up/step-down type, receives a DC input voltage $V_{IN}$ at an input terminal 102 and supplies a stepped-up or stepped-down output voltage $V_{OUT}$ to a load (not shown) connected to an output terminal 104.

The DC/DC converter 100 includes a plurality of transistors M1 to M4, an inductor L1, an output capacitor C1 and a control circuit 300. The control circuit 300 includes an error amplifier 310, a pulse modulator 320, a logic circuit 330, a pre-driver 340, an auxiliary circuit 350 and a voltage source 360, and is an integrated circuit (IC) integrated in one semiconductor chip.

The output voltage $V_{OUT}$ is divided by resistors R11 and R12, and a feedback voltage $V_{FB}$ obtained by the voltage division is input to a feedback (FB) pin of the control circuit 300. The resistors R11 and R12 may be omitted, and the output voltage $V_{OUT}$ before the voltage division may be input to the FB pin as the feedback voltage $V_{FB}$.

The error amplifier 310 generates an error voltage $V_{ERR}$ corresponding to an error between the feedback voltage $V_{FB}$ based on the output voltage $V_{OUT}$ of the DC/DC converter 100 and a reference voltage $V_{REF}$.

The pulse modulator 320 generates a PWM signal $S_{PWM}$ corresponding to the error voltage $V_{ERR}$. A modulation method of the pulse modulator 320 is not particularly limited, but may be any methods such as a voltage mode, a peak current mode, an average current mode and the like.

The logic circuit 330 generates control pulses S1 to S4 instructing the transistors M1 to M4 to turn on/off based on the PWM signal $S_{PWM}$. The pre-driver 340 drives the corresponding transistors M1 to M4 based on the control pulses S1 to S4.

With the above configuration, during normal operation, the feedback voltage $V_{FB}$ is stabilized to the reference voltage $V_{REF}$, and thus the output voltage $V_{OUT}$ is stabilized to a target voltage $V_{OUT(REF)}$ given by the following equation (1).

$$V_{OUT(REF)} = V_{REF} \times (R11+R12)/R12$$

The control circuit 300 has a ramp-down function for decreasing the output voltage $V_{OUT}$ to zero in a predetermined period of time (for example, 100 µs) in response to an external control signal (stop instruction) RAMPDOWN_START. Specifically, in response to the stop instruction RAMPDOWN_START, the voltage source 360 lowers the reference voltage $V_{REF}$ from a normal voltage level to zero with a constant slope over time. That is, the reference voltage $V_{REF}$ becomes a ramp signal $V_{RAMP}$ having a ramp waveform when the DC/DC converter 100 is stopped.

The configuration of the voltage source 360 is not particularly limited. For example, the voltage source 360 may include a waveform generator which generates a digital signal that changes with time, and a digital/analog converter which converts the digital signal into an analog voltage. Alternatively, the voltage source 360 may include a capacitor and a discharge circuit which discharges the capacitor with a constant current, and may output a voltage of the capacitor as a reference voltage (ramp signal).

A feedback loop including the error amplifier 310 provides feedback so that the output voltage $V_{OUT}$ decreases following the decrease of the reference voltage $V_{REF}$. However, a decrease speed of the output voltage $V_{OUT}$ is limited by a response speed of the error amplifier 310. The auxiliary circuit 350 is provided to increase the decrease speed of the output voltage $V_{OUT}$.

The auxiliary circuit 350 is enabled during ramp-down in which the output voltage $V_{OUT}$ of the DC/DC converter 100 decreases, and is disabled during normal operation in which the output voltage $V_{OUT}$ is constant. The enabling/disabling of the auxiliary circuit 350 can be switched based on the control signal RAMPDOWN_START input to an enable terminal.

In the enable state, the auxiliary circuit 350 compares the feedback voltage $V_{FB}$ with the ramp signal $V_{RAMP}$ that decreases with time, and sources or sinks an auxiliary current $I_{AUX}$ at the output of the error amplifier 310 according to the comparison result.

The direction of the auxiliary current $I_{AUX}$ (i.e., whether it is a source or a sink) depends on the configuration of the feedback loop. In the present embodiment, the output voltage $V_{OUT}$ decreases as the error voltage $V_{ERR}$ increases. Therefore, the auxiliary current $I_{AUX}$ flows such that the error voltage $V_{ERR}$ increases (that is, the auxiliary circuit 350 sources the auxiliary current $I_{AUX}$).

The above is the configuration of the control circuit 300. Subsequently, an operation thereof will be described. During the ramp-down, the reference voltage $V_{REF}$ decreases with time. When the decrease of the feedback voltage $V_{FB}$ is delayed from the decrease of the reference voltage $V_{REF}$ (ramp signal $V_{RAMP}$), $V_{FB}$ becomes larger than $V_{REF}$ (i.e., $V_{FB} > V_{REF}$) and the auxiliary circuit 350 outputs the auxiliary current $I_{AUX}$ to assist the increase speed of the error voltage $V_{ERR}$, thereby increasing the decrease speed of the output voltage $V_{OUT}$.

When the decrease of the feedback voltage $V_{FB}$ proceeds more than the decrease of the reference voltage $V_{REF}$ (the ramp signal $V_{RAMP}$), the auxiliary current $I_{AUX}$ becomes zero and the error voltage $V_{ERR}$ is adjusted by the error amplifier 310.

By repeating this operation at the time of ramping-down, the control circuit 300 can decrease the output voltage $V_{OUT}$ according to the ramp signal.

According to the control circuit 300, by combining the feedback voltage (closed loop) control including the error amplifier 310 with the open loop control by the auxiliary circuit 350, it is possible to increase the decrease speed of the output voltage without affecting the stability of the feedback loop. In addition, since it is not necessary to increase the operating current of the error amplifier 310, it is possible to suppress an increase in the quiescent current during normal operation.

The present disclosure is understood as the block diagram and circuit diagram of FIG. 2 or covers various devices and methods derived from the above description. However, the present disclosure is not limited to the disclosed particular configurations. Hereinafter, more specific examples and modifications will be described in order to aid the understanding of the nature and circuit operation of the present disclosure and clarify them, rather than to narrow a scope of the present disclosure.

First Embodiment

Figure 3:
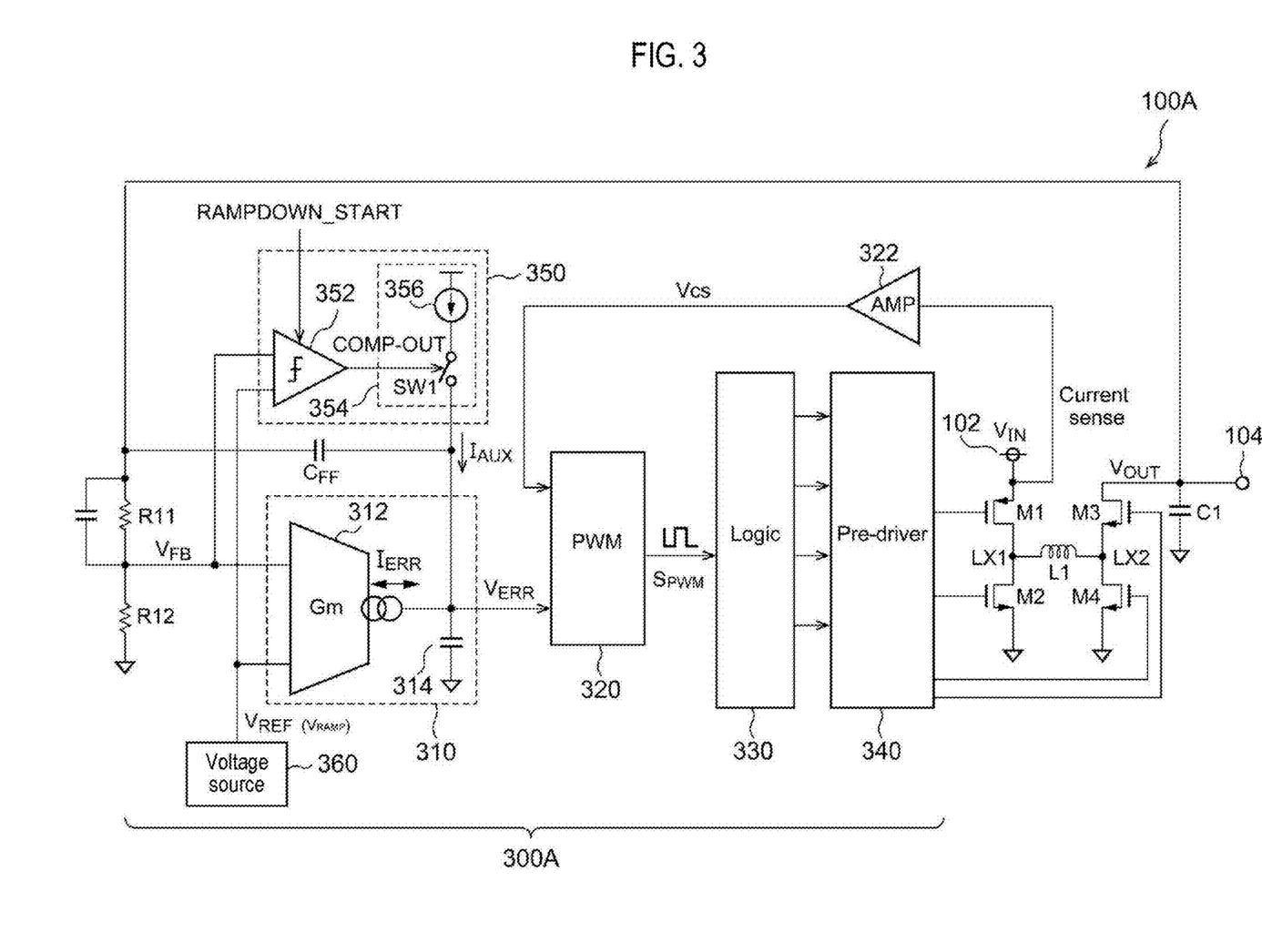
FIG. 3 is a circuit diagram of a DC/DC converter including a control circuit according to a first embodiment of the present disclosure.

FIG. 3 is a circuit diagram of a DC/DC converter 100A including a control circuit 300A according to a first embodiment of the present disclosure. An error amplifier 310 includes a gm amplifier 312 and a capacitor 314. One end of the capacitor 314 is grounded. The gm amplifier 312 receives a feedback voltage $V_{FB}$ and a reference voltage $V_{REF}$, generates an error current $I_{ERR}$ corresponding to an error between those voltages, and charges/discharges the capacitor 314.

In order to reduce a quiescent current Iq of the control circuit 300A, an output current capability of the gm amplifier 312 is designed to be several tens of nA (for example, 30 nA). On the other hand, the output current capability of an auxiliary circuit 350 is designed to be higher than an output current capability of the gm amplifier 312.

The auxiliary circuit 350 includes a comparator 352 and a current source 354. The comparator 352 is enabled in response to a control signal RAMPDOWN_START, and compares a feedback voltage $V_{FB}$ with a ramp signal $V_{RAMP}$ (the reference voltage $V_{REF}$). The current source 354 is connected to the output of the error amplifier 310, that is, to the capacitor 314, and is configured to be able to be turned on/off in response to the output COMP_OUT of the comparator 352. For example, the current source 354 may include a constant current source 356 and a switch SW1 provided on a path of a current generated by the constant current source 356, and may control the switch SW1 according to the output COMP_OUT of the comparator 352. Alternatively, turning the constant current source 356 on/off may be directly controlled in accordance with the output COMP_OUT of the comparator 352.

The control circuit 300A includes a feed forward capacitor $C_{FF}$. One end of the feed forward capacitor $C_{FF}$ is connected to an output terminal 104 and the other end thereof is connected to an output node of the error amplifier 310. The feed forward capacitor $C_{FF}$ can improve a load responsiveness in the normal state.

A pulse modulator 320 includes, for example, a current mode modulator. A current detection circuit 322 generates a current detection signal $V_{CS}$ corresponding to a current flowing through an inductor L1. The pulse modulator 320 adjusts a duty ratio of a PWM signal such that a peak (or average value) of the current detection signal $V_{CS}$ approaches an error voltage $V_{ERR}$.

Figure 4:
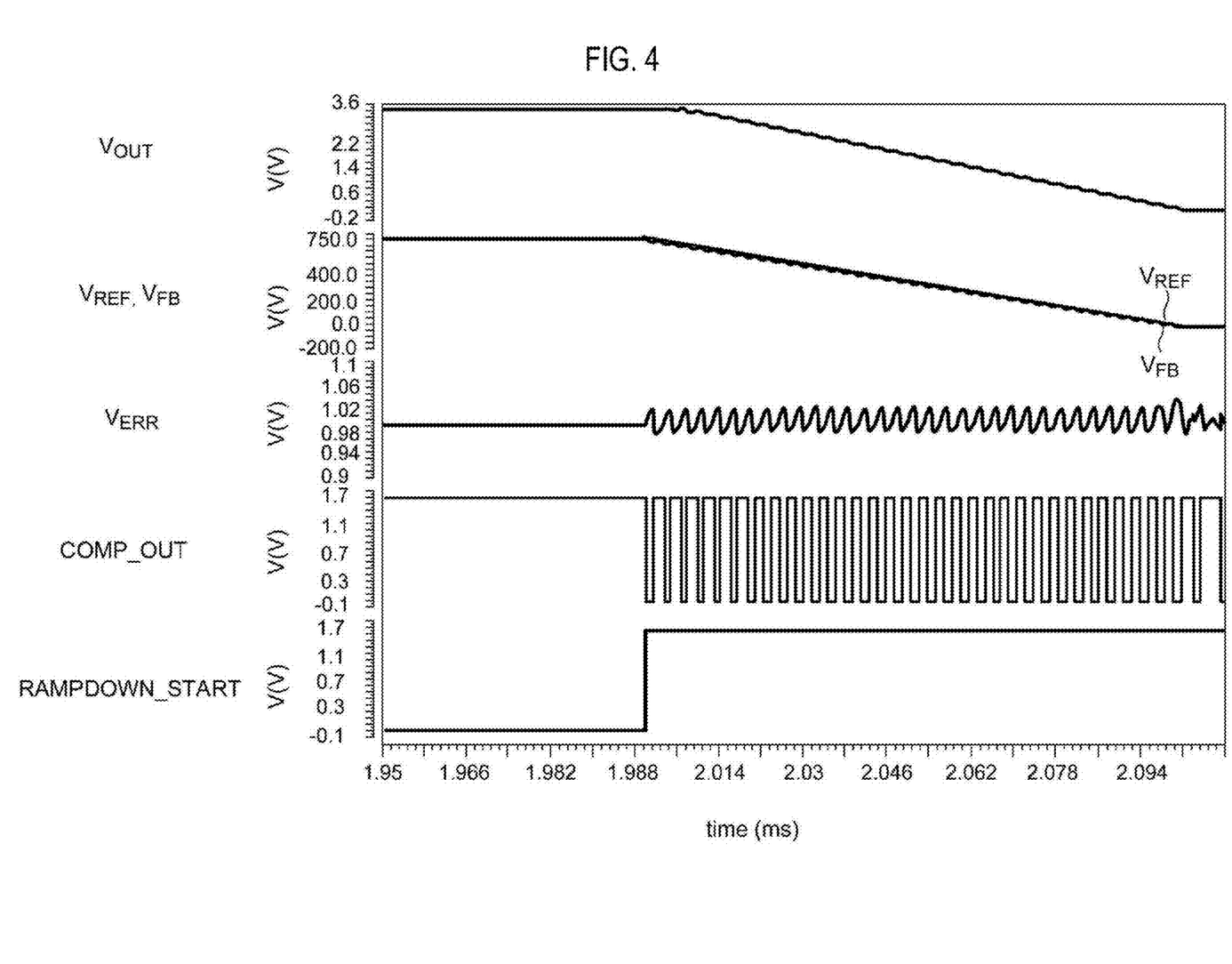
FIG. 4 is an operation waveform diagram of the DC/DC converter of FIG. 3.

The above is the configuration of the DC/DC converter 100A. Subsequently, the operation thereof will be described. FIG. 4 is an operation waveform diagram of the DC/DC converter 100A of FIG. 3.

At time t0, the control signal RAMPDOWN_START is asserted (becomes high level) and the auxiliary circuit 350 is enabled. In response to the assertion of the control signal RAMPDOWN_START, the voltage source 360 ramps down the reference voltage $V_{REF}$ toward 0 V over 100 μs.

The COMP_OUT signal changes between high and low according to a magnitude relationship between the feedback voltage $V_{FB}$ and the reference voltage $V_{REF}$. When $V_{FB} > V_{REF}$, the COMP_OUT signal goes low, and the current source 354 is turned on. As a result, an auxiliary current $I_{AUX}$ is injected into the capacitor 314 to increase the error voltage $V_{ERR}$ and decrease the output voltage $V_{OUT}$. When $V_{FB} < V_{REF}$ due to the decrease in the output voltage $V_{OUT}$, the COMP_OUT signal goes high, the current source 354 is turned off, and the injection of the auxiliary current $I_{AUX}$ is stopped.

By repeating this operation, the output voltage $V_{OUT}$ may be ramped down following the ramp waveform of the reference voltage $V_{REF}$.

Figure 5:
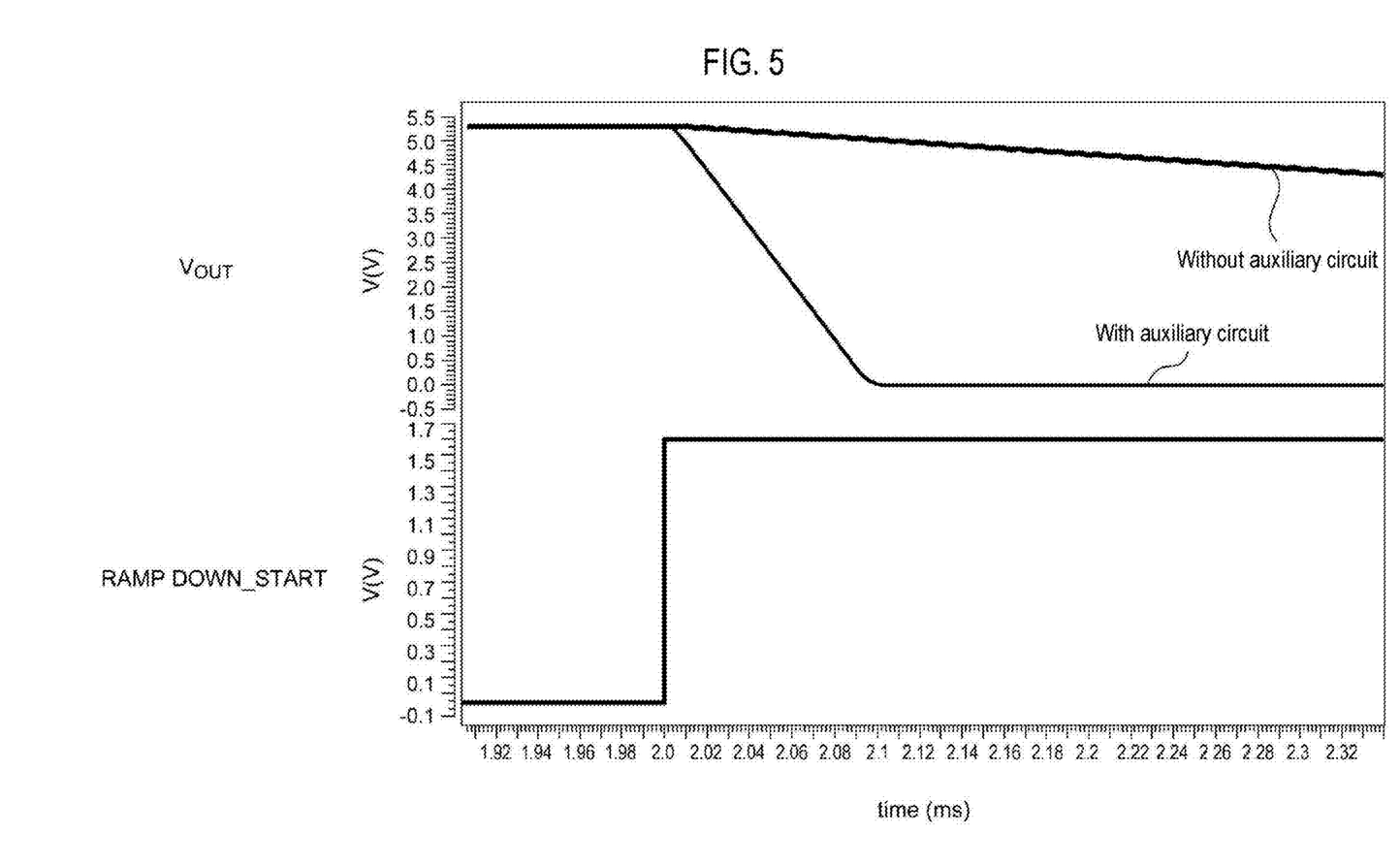
FIG. 5 is a waveform diagram of an output voltage $V_{OUT}$ with and without an auxiliary circuit.

FIG. 5 is a waveform diagram of the output voltage $V_{OUT}$ with and without an auxiliary circuit. When there is no auxiliary circuit, that is, in the DC/DC converter 100R of FIG. 1, the output voltage $V_{OUT}$ decreases at a very low speed. On the other hand, when an auxiliary circuit is provided, the output voltage $V_{OUT}$ can be ramped down in a short time of 100 μs.

The present disclosure has been described above by way of embodiments. The disclosed embodiments are illustrative only. It should be understood by those skilled in the art that various modifications to combinations of elements or processes may be made and such modifications fall within the scope of the present disclosure. Such modifications will be described below.

First Modification

Figure 6:
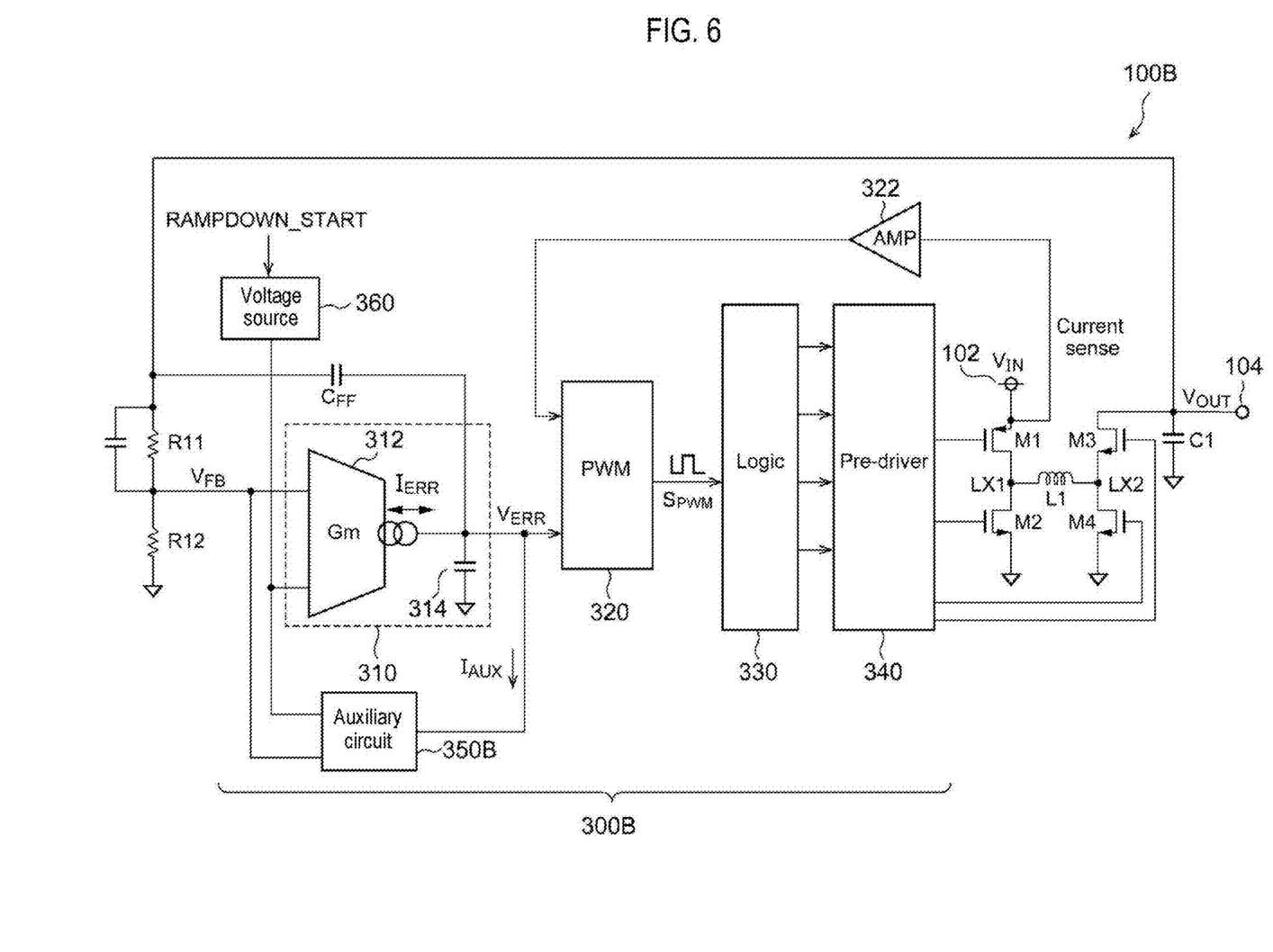
FIG. 6 is a circuit diagram of a DC/DC converter according to a first modification of the present disclosure.

FIG. 6 is a circuit diagram of a DC/DC converter 100B according to a first modification. In this modification, a control circuit 300B performs feedback so that the output voltage $V_{OUT}$ decreases as the error voltage $V_{ERR}$ increases. In that case, in an auxiliary circuit 350B, an auxiliary current $I_{AUX}$ flows such that the error voltage $V_{ERR}$ decreases (that is, the auxiliary circuit 350B sinks the auxiliary current $I_{AUX}$). Others are the same as FIG. 3.

Second Modification

Figure 7A:
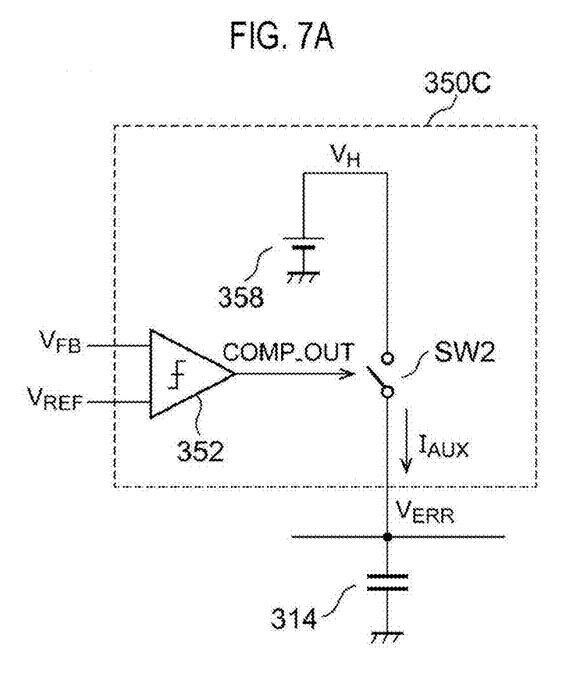
FIG. 7A and FIG. 7B are circuit diagrams of an auxiliary circuit according to a second modification of the present disclosure.
Figure 7B:
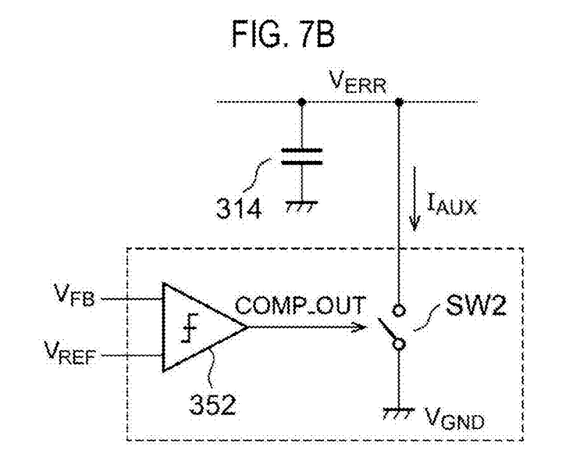

FIG. 7A and FIG. 7B are circuit diagrams of an auxiliary circuit 350C according to a second modification. The auxiliary circuit 350C may be configured by a combination of a voltage source 358 and a switch SW2. FIG. 7A shows a configuration for sourcing the auxiliary current $I_{AUX}$. When the switch SW2 is turned on by the output COMP_OUT of the comparator 352, a voltage $V_H$ of the voltage source 358 is applied to the capacitor 314, and the auxiliary current $I_{AUX}$ flows through the capacitor 314. A resistor may be inserted in series with the switch SW2.

FIG. 7B shows a configuration for sinking the auxiliary current $I_{AUX}$. In this case, the voltage source 358 in FIG. 7A may be omitted, and a ground voltage $V_{GND}$ may be used.

Third Modification

In the embodiments, the transistors M1 to M4 are provided outside the control circuit 300. However, these transistors may be integrated in the control circuit 300. The transistor M3 may be a P-channel type transistor.

Fourth Modification

In the embodiments, a step-up/step-down converter has been described. However, the present disclosure may also be applied to a step-down (buck) converter.

Fifth Modification

In the embodiments, the ramp-down has been described. However, a ramp-up may be handled with the same configuration. The ramp-down and ramp-up are not limited to those when the DC/DC converter 100 is stopped or started. For example, the present disclosure is also effective in a case where the target voltage $V_{OUT(REF)}$ of the output voltage $V_{OUT}$ is changed from a first level to a second level during the operation of the DC/DC converter 100.

(Applications)

Figure 8:
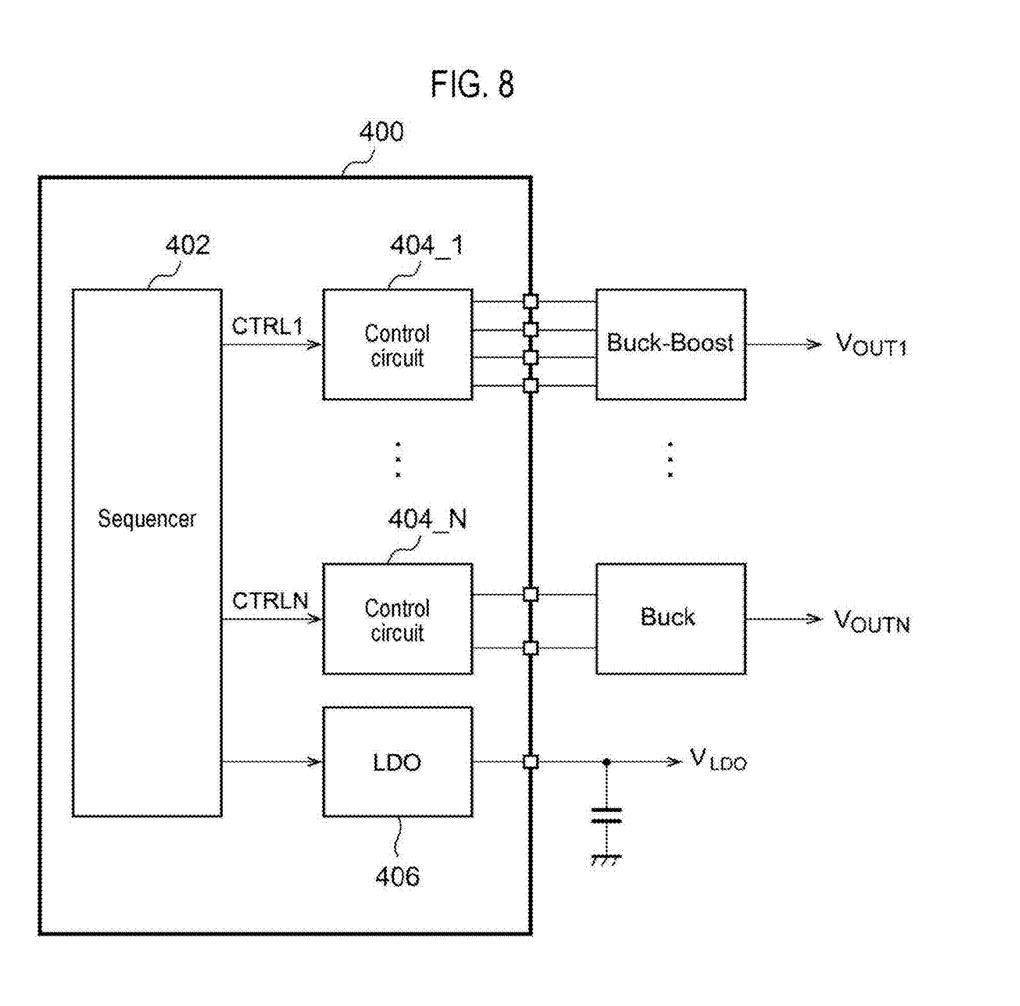
FIG. 8 is a block diagram of a power management IC.

The control circuit 300 may be mounted on a PMIC (power management IC). FIG. 8 is a block diagram of a power management IC 400. The power management IC 400 manages a power supply circuit having a plurality of channels (N channels). The power management IC 400 is mounted on various electronic devices and electronic components such as a smartphone, a tablet terminal, a computer, an SSD (Solid State Drive), and so on. The power management IC 400 includes a sequencer 402, a plurality of control circuits 404_1 to 404_N corresponding respectively to the N channels, and a linear regulator (LDO) 406. In this example, among the control circuits 404_1 to 404_N, the control circuit 404_1 is a control circuit for a step-up/step-down converter and may be configured with the architecture of the control circuit 300 described above. Another control circuit 404_N is a control circuit for a step-down converter and can be configured with the architecture of the control circuit 300 described above.

The sequencer 402 outputs control signals CTRL 1 to CTRLN to the respective control circuits 404 in a predetermined order and at a predetermined timing when the system is started or stopped. Each of these control signals includes the above-mentioned RAMPDOWN_START signal and the like.

According to the present disclosure in some embodiments, it is possible to change an output voltage $V_{OUT}$ at a high speed while suppressing the quiescent current.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter, comprising:
an error amplifier configured to generate an error voltage corresponding to an error between a feedback voltage based on an output voltage of the DC/DC converter and a reference voltage;
a pulse modulator configured to generate a control pulse corresponding to the error voltage; and
an auxiliary circuit configured to be enabled, when the output voltage of the DC/DC converter is decreased, to compare the feedback voltage with a ramp signal that decreases with time, and source or sink an auxiliary current to an output of the error amplifier according to a result of the comparison,
wherein the error amplifier includes:
a capacitor; and
a transconductance amplifier configured to receive the feedback voltage and the reference voltage, and charge and discharge the capacitor according to the error between the feedback voltage and the reference voltage, and
wherein a current which the auxiliary circuit is capable of outputting is greater than a current which the transconductance amplifier is capable of outputting.

2. The control circuit of claim 1, further comprising: a voltage source configured to decrease the reference voltage with time when the DC/DC converter is stopped,
wherein the reference voltage is input to the auxiliary circuit as the ramp signal.

3. The control circuit of claim 1, wherein the auxiliary circuit includes:
a comparator configured to compare the feedback voltage with the ramp signal; and
a current source connected to the output of the error amplifier and capable of being controlled to be turned on/off in accordance with an output of the comparator.

4. The control circuit of claim 1, further comprising a feed forward capacitor interposed between an output terminal of the DC/DC converter and the output of the error amplifier.

5. The control circuit of claim 1, wherein the control circuit is integrated in a single semiconductor substrate.

6. A control circuit for a DC/DC converter, comprising:
an error amplifier configured to generate an error voltage corresponding to an error between a feedback voltage based on an output voltage of the DC/DC converter and a reference voltage;
a pulse modulator configured to generate a control pulse corresponding to the error voltage; and
an auxiliary circuit configured to be enabled, when the output voltage of the DC/DC converter is increased, to compare the feedback voltage with a ramp signal that increases with time, and source or sink an auxiliary current to an output of the error amplifier according to a result of the comparison,
wherein the error amplifier includes:
a capacitor; and
a transconductance amplifier configured to receive the feedback voltage and the reference voltage, and charge and discharge the capacitor according to the error between the feedback voltage and the reference voltage, and
wherein a current which the auxiliary circuit is capable of outputting is greater than a current which the transconductance amplifier is capable of outputting.

7. The control circuit of claim 6, further comprising: a voltage source configured to increase the reference voltage with time when the DC/DC converter is started,
wherein the reference voltage is input to the auxiliary circuit as the ramp signal.

8. The control circuit of claim 6, wherein the auxiliary circuit includes:
a comparator configured to compare the feedback voltage with the ramp signal; and
a current source connected to the output of the error amplifier and capable of being controlled to be turned on/off in accordance with an output of the comparator.

9. The control circuit of claim 6, further comprising a feed forward capacitor interposed between an output terminal of the DC/DC converter and the output of the error amplifier.

10. The control circuit of claim 6, wherein the control circuit is integrated in a single semiconductor substrate.

* * * * *